April 4, 1967

F. PFISTER III 3,312,014

GRAVE MARKER

Filed Aug. 11, 1966

April 4, 1967  F. PFISTER III  3,312,014
GRAVE MARKER
Filed Aug. 11, 1966  5 Sheets-Sheet 2

April 4, 1967  F. PFISTER III  3,312,014
GRAVE MARKER
Filed Aug. 11, 1966  5 Sheets-Sheet 3

United States Patent Office 3,312,014
Patented Apr. 4, 1967

3,312,014
GRAVE MARKER
Frank Pfister III, Willow Grove, Pa., assignor to
Gorham Corporation, Providence, R.I.
Filed Aug. 11, 1966, Ser. No. 571,838
14 Claims. (Cl. 47—41.1)

This application is a continuation-in-part of my earlier and copending application Ser. No. 425,283 filed Jan. 13, 1965, and now abandoned.

This invention relates to grave markers and to elements constituting the same.

Objects of the invention relate more particularly to providing improved markers for hillside graves, or in other words, for use on a sloping terrain and especially to improved markers including flower vases or the like.

According to another main object of the invention, a vase can be invertibly supported on its base so that it can be turned upside down thereby to remove temporarily obstructions to lawn maintenance and the like.

To achieve the above and other of its objectives, the invention generally contemplates the provision of a grave marker comprising a burial plaque provided with an opening, there being an element extending through this opening and tiltably adjustable relative to the plaque.

Said element may comprise a base positioned, preferably invertibly in the opening in the plaque with a utilitarian device connected to the base by a means which provides for the tiltable adjustment of said utilitarian device and a fixing of the same in position.

More particularly, there is contemplated in accordance with one specific embodiment of the invention a grave marker comprising a flat rectangular burial plaque having thereon decorative material and information relating to a deceased person, this plaque being provided with a circular opening therein. In addition, there is provided a receptacle element extending through the opening and adjustable to vertical attitude despite at least a limiting range of various inclinations of the plaque.

Said receptacle element comprises in accordance with this embodiment of the invention a base positioned in the opening such that the plaque encircles the same. A circular decorative collar is provided atop the base and forms a mount therewith, the mount being provided with an upwardly facing spherical concave recess and an elongated face including a bottom shaped generally in conformance with the recess and positioned in the latter.

In further accordance with this embodiment of the invention a means is provided in the bottom defining at least one slot curved in correspondence with the recess but spaced from the bottom thereof. Still further, a pin supported on said mount engages in the aforesaid slot and permits guided tilting of the vase in the recess. Finally, thread means is operatively associated with the vase and pin for selectively pulling the vase against the mount or loosening the vase in the recess so that the vase can be selectively fixed in position or loosened for adjustment.

According to the invention, the advantage is achieved that a vase or the like can be adjusted for being positioned in vertical attitude despite the inclination of the associated burial plaque, while in addition the vase can be rigidly set in position when said position has been determined to be proper.

As a supplemental advantage when a vase constitutes the utilitarian device, such vase may be employed in adjusted position such that it can be filled with water to any desired level, while at the same time flowers placed in such vase will be less prone to fall out of the same due to climatic conditions or the like.

As a further advantage of the invention, the vases thereof may be readily reset in a position whereat they are perpendicular to the associated plaques and further when such vases are so positioned they can be inverted in their accommodations when not in use.

Still another advantage of the invention is that it permits the use of vases which may be separate and independent from the associated plaques.

The above objects and advantages, as well as features thereof, will become apparent from the following detailed description of some preferred embodiments as illustrated in the accompanying drawing in which.

Figure 1:
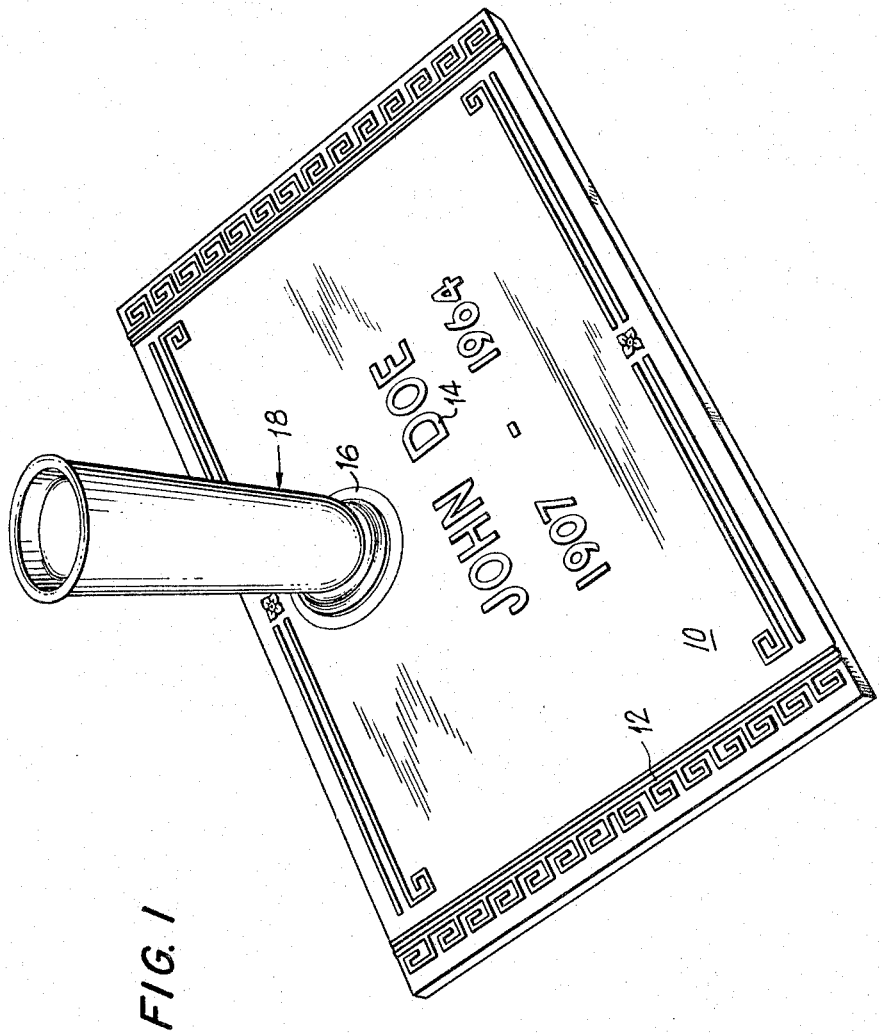
FIGURE 1 is a perspective view of a grave marker provided in accordance with the invention and comprising a burial plaque and associated tiltably adjustable vase.

The burial plaque 10 of FIG. 1 is preferably of flat rectangular or quadrilateral shape and will generally be made of bronze or such other suitable weather-resistant material.

It is preferably provided with decorative material 12 and generally will bear thereon a legend consisting of information relating to a decreased person.

In the illustrated embodiment the burial plaque 10 is provided with a circular opening 16 wherethrough extends a tiltably adjustable receptacle element 18.

In view of the fact that the receptacle element 18 is tiltably adjustable with respect to the plaque 10, it may be adjusted to vertical attitude despite the fact that the plaque may be displaced through at least a limited range of various inclinations. For example, if the plaque 10 is positioned on a hillside having a slope of 10°, the receptacle element 18 may be readily adjusted to compensate for this slope such that it assumes a vertical attitude.

Figure 3:
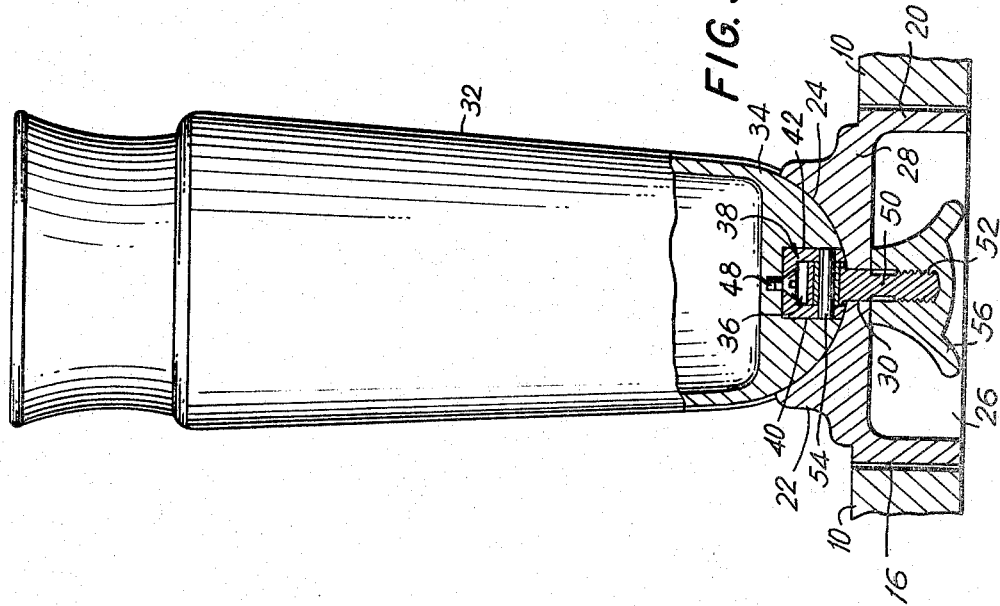
FIGURE 3 is a view at a right angle to FIG. 2, also partially broken away and in section.
Figure 2:
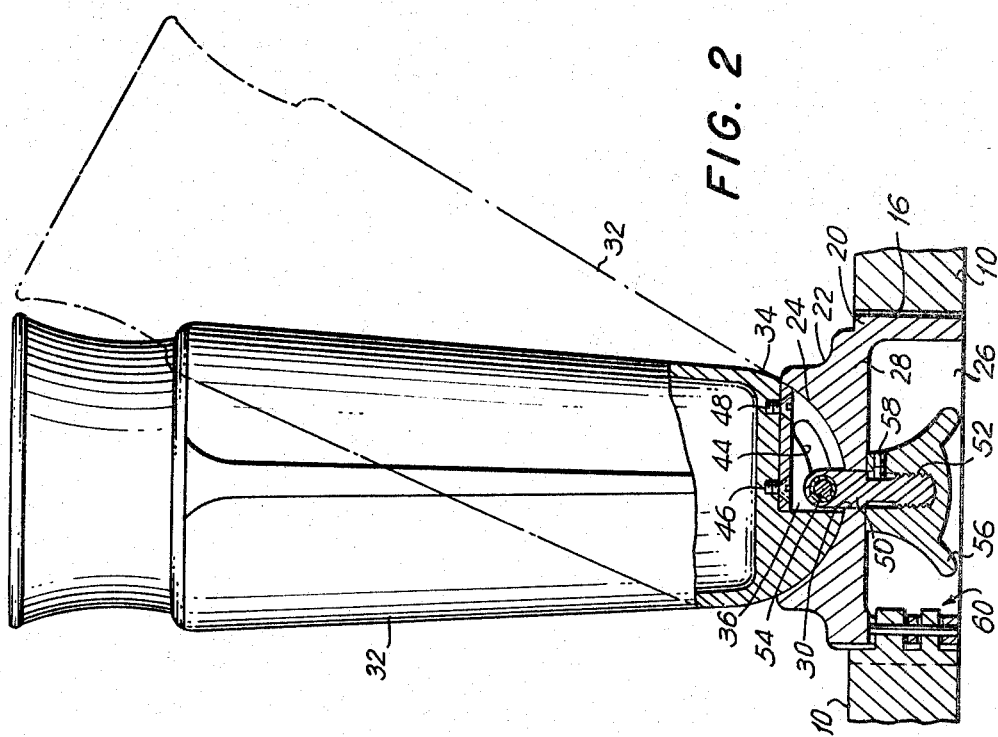
FIGURE 2 is a side view, partially in section, of a vase suitable for use in the structure of FIG. 1, said view being partially broken away and shown in section, phantom lines showing tilted position of the vase.
Figure 5:
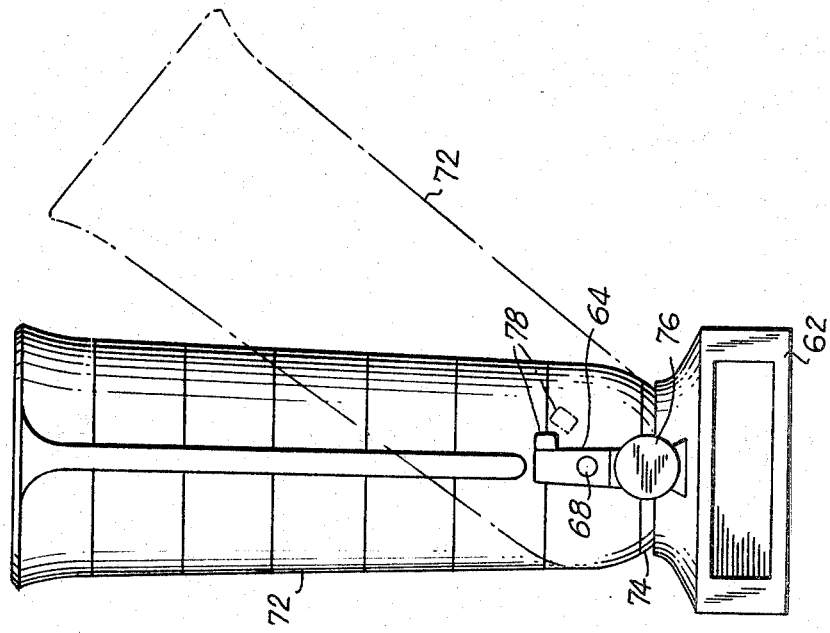
FIGURE 5 is a view corresponding to that of FIG. 3, but of the embodiment of FIG. 4.

FIGS. 2 and 3 illustrate the construction of one preferred type of receptacle element adapted for use in the construction of FIG. 1 and for purposes of orientation the plaque 10 is in part again illustrated in FIGS. 2 and 3.

In these latter figures it appears that the receptacle element comprises a cylindrical or circular base 20 having a circular decorative collar 22 positioned thereon. Said base 20 is accommodated within the circular opening in the plaque 10 and thus is encircled by the latter.

The base 20 and circular decorative collar included therein cooperatively constitute a mount having an upwardly facing spherical concave recess 24 and a downwardly facing opening 26, said recess and opening being separated by a web 28 through which extends a hole 30, the purpose of which will become hereinafter apparent. Another very important part of the receptacle element is the utilitarian device of vase 32 which is also preferably fabricated of bronze or the like and which is also preferably of elongated shape in order to constitute a proper holder for flowers or the like.

Vase 32 includes a bottom 34 which is of spherical shape or, in other words, is shaped in conformance with the shape of recess 24. Thus the bottom of the vase may be readily and adjustably accommodated in the recess in the nature of a ball and socket joint.

The bottom 34 of the vase 32 is provided with a quadrant-type recess 36 within which is provided a downwardly facing U-shaped channel 38 which includes side plates 40 and 42. Each of said side plates is provided with an arcuate slot 44 having the same angle of curvature at the bottom 34 and the recess 24. The slot 44 is, however, spaced from the bottom of the recess while being parallel thereto.

Channel 38 may be readily fastened to the bottom of the base such as by means of screws 46 and 48.

Slidably mounted in the hole 30 in web 28 or, in other words on the mount constituted by base 20 and collar 22, is a support or rod 50 having a thread 52 at its lower end. A horizontal pin 54 is mounted at the top of the support or rod 50 and engages in the slots 44. Said pin constitutes a means for permitting a guided tilting of the vase 32 in the aforesaid mount.

Threadably engaged with the thread 52 of the support 50 is a wing nut or lock nut 56, the purpose of which is to pull support 50 downwardly so that the vase bottom 34 is pulled tightly into the recess 24 after the proper tilting of the vase 32 has been arranged. Stated otherwise, there is thusly provided a thread means operatively associated wtih the aforesaid support or pin for selectively pulling the vase bottom 34 against the base 20 or mount constituted thereby for loosening the vase bottom in the recess whereby the vase may be selectively fixed in position or loosened for adjustment.

It is to be noted that connection of nut 56 to support 50 can be effected through the use of a set screw 58. Also to be noted is the provision of security means 60, which will be explained hereafter relative to another embodiment.

Figure 4:
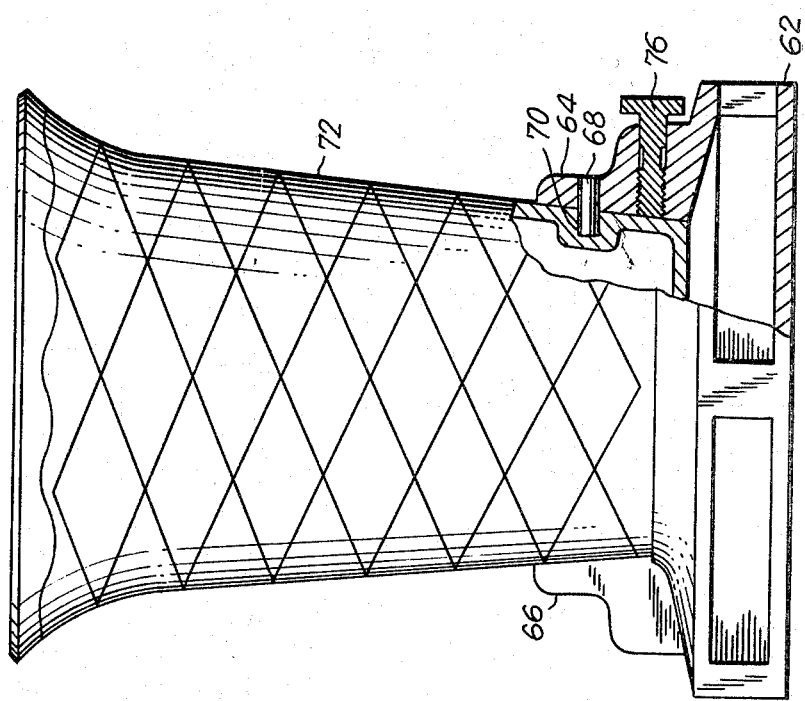
FIGURE 4 is a view corresponding to that of FIG. 2, but of another embodiment of the invention.

The receptacle element shown in FIG. 4 similarly consists of a base 62 on which are mounted supports 64 and 66 in spaced relation. On the supports are mounted coaxially aligned pins 68, the purpose of which is to be accommodated within corresponding bores 70 provided in the vase 72.

In this embodiment of the invention the vase 72 is provided with a bottom 74 which is of semi-cylindrical shape. Said bottom 74 is accommodated between the supports 64 and 62 and pins 68 extend in parallel with the axis of the cylinder.

In addition, a threaded means 76 is provided which is adapted to lock the vase 72 in any of a number of positions which the vase 72 may assume in its rotational displacement on pins 68.

Also to be noted is the provision of an abutment 78 provided on the face 72, said abutment functioning to limit the pivoting movement of the vase 72 in one rotational movement of the latter.

In this embodiment of the invention a burial plaque is provided which has a rectangular opening in which is accommodated the base 62, the receptacle element being adapted to extend through this opening and being adjusted to vertical attitude despite the inclination of the plaque.

Figure 6:
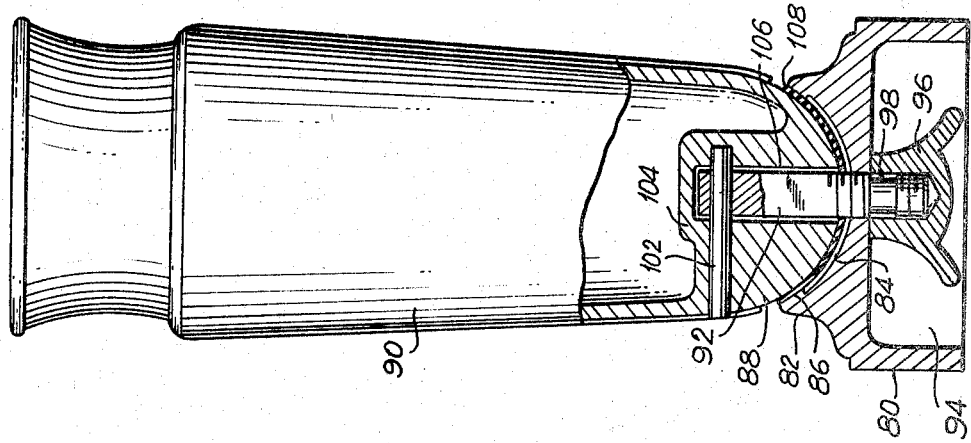
FIGURE 6 is a side view, partially in section, of another embodiment of the invention.
Figure 7:
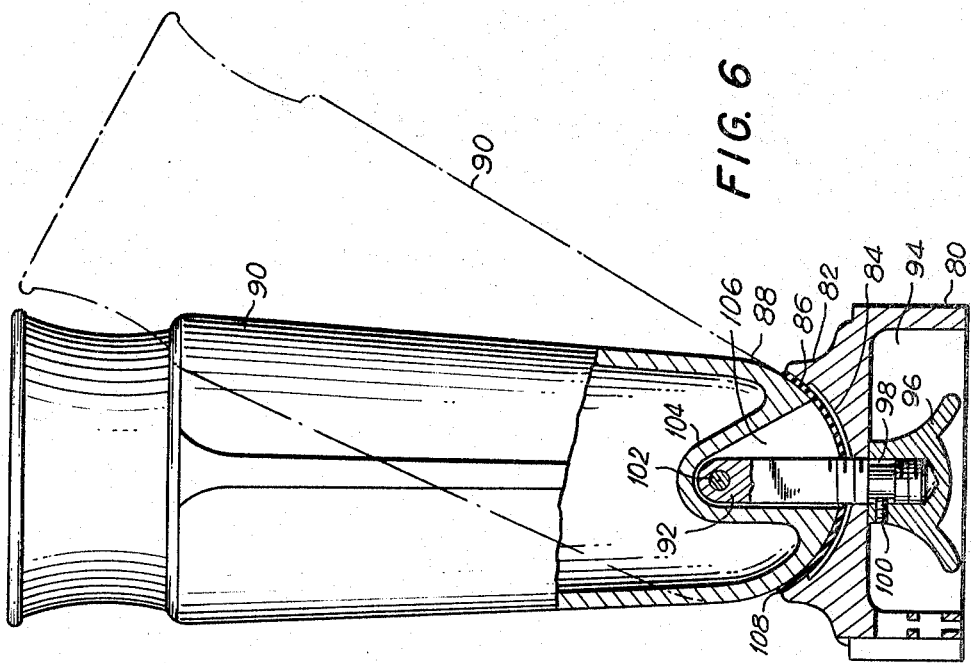
FIGURE 7 is a view perpendicular to that of FIG. 6.

According to the embodiment of the invention illustrated in FIGS. 6 and 7, there is provided a base 80, at the top of which is mounted a collar 82, these two elements constituting a mount defining an upwardly facing spherical recess 84, peripherally surrounded by a glider surface 86 which supports the bottom 88 of a vase 90.

A vertical and threaded support member 92 extends through the bottom of the recess 84 and into a bottom chamber 94, whereat there is threadably engaged a handle 96. Said member 92 is provided with an annular groove 98, within which is accommodated a set pin 100 which extends through the handle 96.

A horizontal pivot pin 102 is supported by the vertical member 92 and extends in diametral direction through the bottom of the vase 90, said pin 102 extending from one side of the vase part way through to the other side, so as to have a length which is greater than the radius of the vase in this vicinity but less than the diameter.

The bottom of the vase is provided with a section 104, which defines a downwardly facing opening 106, having a triangular cross-section in the plane illustrated in FIG. 6. The purpose of this triangular cross-section is to limit the pivoting movement of the vase 90 relative to the mount constituted by base 80 and collar 82, the vase 90 being locked in position by operation of the handle 96.

In this embodiment of the invention there may be employed a disc 108 of natural or synthetic rubber or plastic, this disc constituting a resilient member which facilitates engagement between the vase and the mount supporting the same.

As in the prior embodiments of the invention, the recess 84, as well as the glider surface 86, are of a spherical configuration matching the configuration of the bottom of the vase which is thereby permitted universal movement between the limits implied by the shape of the opening 106.

In all of the aforenoted embodiments, which may be varied within the scope of the appended claims, provision is made for tiltable adjustment of a vase relative to a burial plaque. Said plaque may take various forms within the scope of the invention and under certain circumstances it may be considered that the tiltable vase has a utility which permits its use independently of said plaque.

Figure 8:
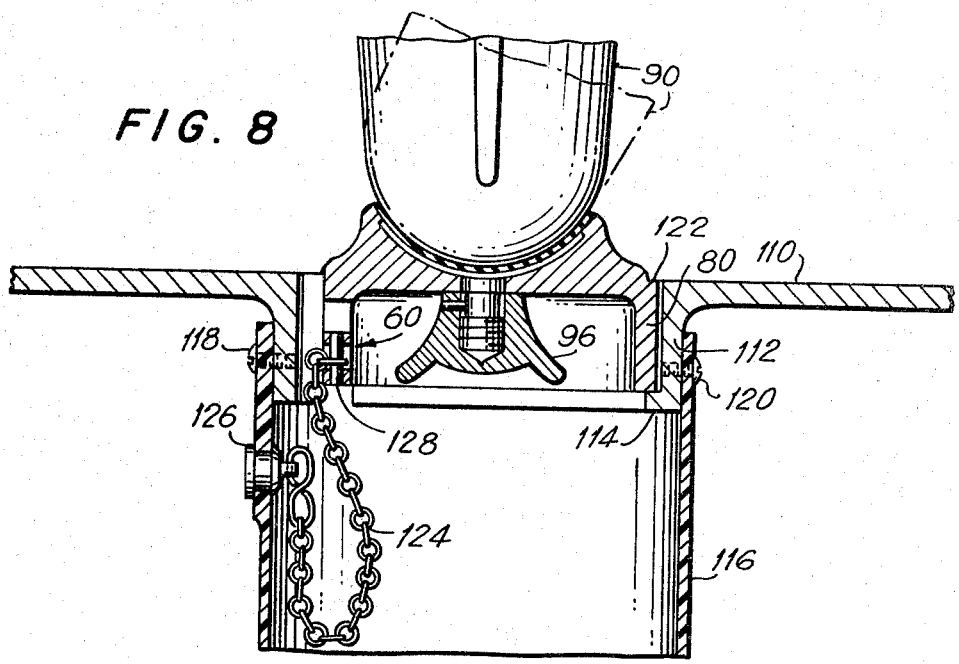
FIGURE 8 is a partially broken away partially sectional view of the embodiment of FIGS. 6 and 7 in an installation showing a further feature of the invention in accordance with which the vase can be inverted.
Figure 9:
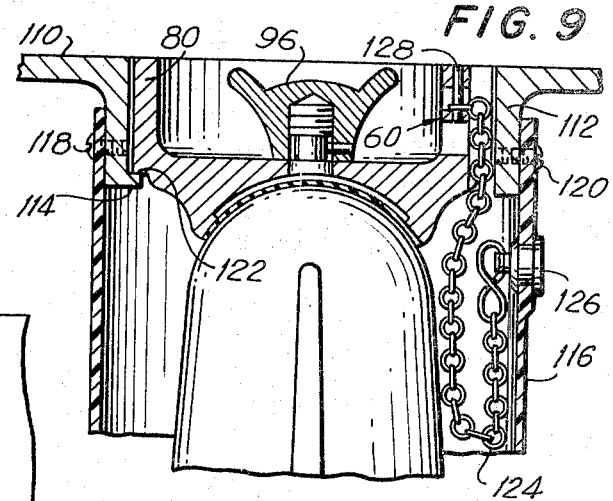
FIGURE 9 is a view similar to that of FIG. 8, showing the vase in inverted attitude.
Figure 10:
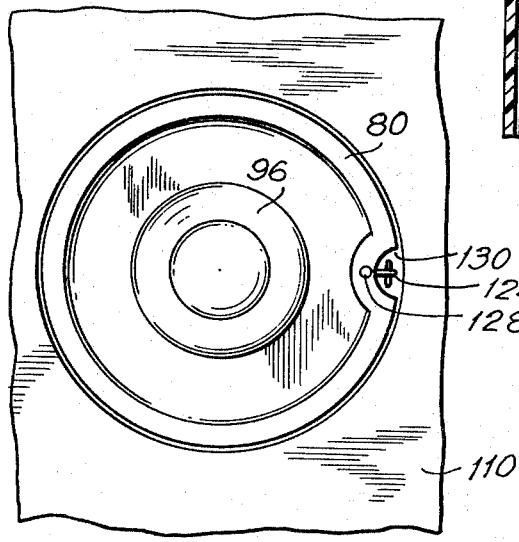
FIGURE 10 is a bottom view of the arrangement shown in FIG. 9.

FIGS. 8–10 show a very important possibility offered in accordance with the invention and more particularly directed to the provision of constructional features, whereby the adjustable vase or the like can be inverted in its receptacle in order to facilitate maintenance of the surrounding lawn, inasmuch as obstructions constituted by such vases in the paths of lawn mowers and the like are removed.

The improvement indicated in FIGS. 8–10 can be applied to any of the illustrated embodiments, as well as to embodiments which are not illustrated and as well such improvements can be applied to vases which are not adjustable as to their vertical angle.

More particularly there is illustrated in FIGS. 8–10 an arrangement adjusted for accommodating the vase 90 with its base 80 in or on a plaque 110. The plaque 110 is provided with a downwardly extending guide or support 112 which is preferably of cylindrical form. At the bottom of support 112 is an inwardly directed flange 114. Said flange 114 is preferably of circular configuration and is adapted to constitute a means upon which the base 80 which supports the vase 90 can rest.

Also illustrated in FIGS. 8–10 is a cannister 116 of generally cylindrical form connected to the support 112 by means of bolts or screws 118 and 120. The cannister is hollow and is received in a hole in the ground beneath the plaque 110. The cannister is intended to form a protection for the vase 90 in the latter's inverted position.

The base 80 is formed with a shoulder 122 at the upper part thereof, said shoulder 122 being of a shape designed to seat on the flange 114 when the vase is in its inverted position. Thus the flange 114 and the shoulder 122 will have related dimensions such as diameter, in order that the vase may be suspended from said shoulder.

A chain 124 is connected to the cannister by means of a button 126 and is, moreover, connected to the base 80 by means of a pin 128. The base 80 may be provided with a semi-circular opening 130 which accommodates the passage of said chain 124.

It will be understood that the vase is generally in a vertically upright position, as illustrated in FIG. 8, but that during maintenance operations with respect to the surrounding lawn, the vase may be placed in the inverted position illustrated in FIG. 9. The chain 124 will prevent detachment of the vase and thus along with the device 60 constitutes a security means to protect the apparatus against unauthorizer removal.

There will now be obvious to those skilled in the art many modifications and variations of the structures set forth above. These modifications and variations will not depart from the scope of the invention if defined by the following claims.

What is claimed is:

1. A grave marker comprising a receptacle element including a base, a collar on said base and constituting a mount therewith, said mount being provided with an upwardly facing recess within said collar, a vase including a bottom adapted to fit in said recess, means to hold said vase in said recess and to provide for tiltable adjustment of said vase relative to said base, and a burial plaque having thereon information relating to a deceased person, said plaque being provided with an opening, said receptacle element being invertibly located in said opening, said means defining a pivot axis for said vase, which axis is located above said plaque.

2. A marker as claimed in claim 1 wherein said means includes a horizontal pivot pin defining said axis and connected to said mount and about which said vase is adjusted.

3. A marker as claimed in claim 2 wherein said pin is connected to said collar and extends into the bottom of the vase to constitute a pivot axis for the latter, said means further including a locking member on said mount for controllably engaging the vase to fix the latter in position on said pin.

4. A marker as claimed in claim 2 comprising means in the bottom of said vase defining a curved slot fixed relative to the vase and in which said pin is accommodated whereby to permit pivotal movement of the vase in said recess, the first said means including means to pull said pin and thereby said vase towards said mount whereby the vase and mount are engaged to hold the vase in position.

5. A marker as claimed in claim 2 wherein the bottom of said vase and the said recess are spherical to permit universal movement of the vase relative to said mount, said means including a vertical and threaded member extending through said mount and supporting said pin, the bottom of said vase being provided with an opening to accommodate said vertical member with said bottom pivotally engaged on said pin, and a handle for threadably engaging said vertical member to pull the vase against said mount to lock the vase in position.

6. A marker as claimed in claim 5 comprising a resilient member between the vase and mount.

7. A marker as claimed in claim 5 wherein the opening in the bottom of the vase is of triangular cross-section.

8. A marker as claimed in claim 5 wherein said handle is separate from said mount.

9. A marker as claimed in claim 5 wherein said pin is located above said collar.

10. A marker as claimed in claim 9 wherein said pin extends in diametral direction partly through the vase.

11. A marker as claimed in claim 5 comprising a set pin extending through the handle to said vertical member and wherein the vertical member is provided with an annular groove to accommodate the set pin.

12. A marker as claimed in claim 1 comprising a cannister extending downwardly from the opening to protect the receptacle element in inverted position.

13. A marker as claimed in claim 12 comprising a chain connecting the cannister and receptacle element.

14. A marker as claimed in claim 12 comprising a support extending downwardly from said opening and supporting said cannister, said support including an inwardly directed flange to support said base, said base including an upper shoulder to seat on said flange with the receptacle element inverted.

References Cited by the Examiner

UNITED STATES PATENTS

| | | | |
|---|---|---|---|
| 1,396,445 | 11/1921 | Loudon | 47—39 |
| 1,448,808 | 3/1923 | McGowan | 47—34 X |
| 1,924,149 | 8/1933 | Britton | 47—41.1 |
| 2,062,684 | 12/1936 | Thomas | 47—41.1 |
| 2,099,329 | 11/1937 | Comstock et al. | 47—41.1 |
| 2,608,028 | 8/1952 | Ross | 47—41.1 |

ABRAHAM G. STONE, *Primary Examiner.*

ROBERT E. BAGWILL, *Examiner.*